United States Patent

Höcht et al.

[11] Patent Number: 5,883,482
[45] Date of Patent: *Mar. 16, 1999

[54] METHOD AND APPARATUS FOR CONTROLLING A DRIVE IN A MACHINE TOOL

[75] Inventors: Johannes Höcht, Moosburg; Bernhard Leicht, Fürstenfeldbruck, both of Germany

[73] Assignee: The Gleason Works, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 571,949
[22] PCT Filed: Jul. 7, 1994
[86] PCT No.: PCT/EP94/02222
  § 371 Date: Mar. 6, 1996
  § 102(e) Date: Mar. 6, 1996
[87] PCT Pub. No.: WO95/02212
  PCT Pub. Date: Jan. 19, 1995

[30] Foreign Application Priority Data

Jul. 8, 1993 [DE] Germany ............. 43 22 857.7

[51] Int. Cl.⁶ .................................................. G05B 13/02
[52] U.S. Cl. .......................... 318/561; 318/569; 318/601; 318/625; 318/687; 364/474.12; 364/474.17
[58] Field of Search ..................... 318/560–569, 318/600–602, 625, 632, 687; 364/474.01, 474.02, 474.06, 474.11, 474.12, 474.15, 474.17, 474.18, 474.32

[56] References Cited

U.S. PATENT DOCUMENTS

| | | | |
|---|---|---|---|
| 3,665,280 | 5/1972 | Payne et al. | 318/572 |
| 3,970,830 | 7/1976 | White et al. | 451/5 |
| 4,131,837 | 12/1978 | Whetham | 318/571 |
| 4,371,941 | 2/1983 | Gordiski et al. | 364/474.32 |
| 4,604,705 | 8/1986 | Imanishi | 364/474.32 |
| 4,672,550 | 6/1987 | Winterbottom et al. | 364/474.25 |
| 4,817,007 | 3/1989 | New | 364/474.01 |
| 4,974,165 | 11/1990 | Locke et al. | 364/474.35 |

FOREIGN PATENT DOCUMENTS

| | | |
|---|---|---|
| 0311127 | 4/1989 | European Pat. Off. . |
| 9200708 | 7/1992 | Germany . |

OTHER PUBLICATIONS

Dorrscheidt et al., "Grundlagen der Regelungstechnik", [Principles of Control Engineering], B.G. Teubner, Stuttgart, 1989, pp. 427–428.

*Primary Examiner*—David Martin
*Attorney, Agent, or Firm*—Robert L. McDowell; Ralph F. Harper

[57] ABSTRACT

A method and apparatus for controlling the output to a drive for moving a workpiece and/or tool along a defined path in a machine tool. The drive output can be modified according to a periodic controlling variable or a periodic disturbance variable. The defined path of the workpiece is divided into equidistant subdivisions and a control deviation corresponding to each subdivision of the defined path is determined and stored. A control variable is derived from the control deviation and utilized to control the drive output.

12 Claims, 5 Drawing Sheets

METHOD AND APPARATUS FOR CONTROLLING A DRIVE IN A MACHINE TOOL

FIELD OF THE INVENTION

The invention relates to a method for controlling the controller output for a drive for moving a workpiece and/or tool along a defined path in a machine tool, wherein the controller output can be modified according to a periodic controlling variable or a periodic disturbance variable in response to a force acting upon the movement, and to a control arrangement for the application of the method.

BACKGROUND OF THE INVENTION

A control arrangement is known from the German utility patent G 92 00 708.2, which allows for periodically changing controlling and disturbance variables. Processes comprising these variables include stock removal operations such as planing, turning, milling, grinding, boring etc. The periodicity relates not only to the controlling variables, such as the change of the angular position of lathe work, but also to disturbance variables, for example the cutting forces. Additionally, the utility model relates to the coupling of a periodic linear motion with a periodic rotary motion, the coupling of two rotary motions or the coupling of periodic linear motions. Moreover, the prior control setup relates also to fluctuations of synchronism in machine tool drives due to a pole reversal. A tool or workpiece is considered to be a work object.

Conventional control methods do not allow a sufficient suppressing of external disturbance variables thus inviting the risk of instabilities. This relates notably also to the case of equal periodicity of the controlling variable and the disturbance variable.

Described in the book O. Föllinger "Regelungstechnik," Hüthig-Verlag, Heidelberg, 6. edition, p. 519 with literature references p. 526, is an extension, proposed by C. Johnson, of a so-called Luenberger observer by a disturbance model. In this context, a disturbance estimate, calculated correctly by phase and amplitude, is with inverted sign superimposed on the controlled system, such as is done similarly in the known case of directly measurable disturbances by feeding the disturbance variables forward into the controller. This method is suited favorably in using a digital process control computer. For each scanning step, however, both the mathematical mapping of the controlled system and of the disturbance must be calculated. As the complexity of the disturbance model increases, the continual calculation leads to appreciable calculating effort, which in the case of fast processes, such as in controlling electrical drives in machine tools, can overwhelm typical standard microprocessors. The scanning intervals can become impermissibly high, which invites the risk of instabilities. With the addition of a digital measuring system, such as positional determination by angle transmitter, control can be rendered impossible when fluctuations assuming higher frequencies due to the low scanning frequency are being folded back, since the scanning theorem is violated. In addition to eliminating disturbances, the adjustment of a periodic controlling variable which is free of contouring error also poses difficulties.

The aforementioned German utility model G 92 00 708.2 provides a solution to the described control task which does not require a disturbance variable observer. The solution consists in the fact that for adjustment of the periodic controlling variable and/or for tune-out of a periodic disturbance variable, the controller features at least one conjugate complex pole pair, wherein the amount of each of the two poles is equal or approximately equal to the periodic frequency of the disturbance variable. In practice, the configuration of the feedback loop is such that a disturbance compensation system in the form of a disturbance controller is wired parallel to a controller configured in accordance with conventional aspects. This disturbance controller has the aforementioned properties, which are described by the behavior of an integral band-pass controller or a proportional band-pass controller.

The properties of both controller types are represented by their complex transfer functions, that is, the output of the disturbance controller, based on an input that matches the control difference, is represented by the Laplace transform of the respective variables. The complex function variable s allows illustration by way of the relation $s=\delta+\tau\omega$ in a frequency representation that is determined by the amplitude response and the phase response of the controller. Besides, an inverted Laplace transformation makes it possible to achieve a direct representation in the time range.

If in the prior control setup the frequency of the periodic motion changes, the frequency of the disturbance controller of the disturbance compensation system must be adapted. Problems arise when such frequency changes occur within the original period.

Therefore, the objective underlying the invention is to propose an improved control method that eliminates the disadvantages described above and, notably, allows reacting directly to frequency changes of a periodic controlling variable or of a periodic disturbance variable which act upon the movement of a work object being moved along a specific local coordinate.

Furthermore, a control setup for realization of the inventional control method is proposed.

SUMMARY OF THE INVENTION

The present invention comprises a control method in which the predetermined or defined path that a workpiece travels is subdivided in equidistant sections, and where for the equidistantly subdivided defined path of the work object the appropriate control deviation is determined and stored. A corresponding control variable is subsequently obtained from the control deviation, depending on the momentary position of the work along the defined path.

The invention is based on the premise that periodic reference variables and disturbance variables occur frequently not in the original dependence on time, but as a function of a defined path, for instance a position or an angle. By inferring the control deviation on the grounds of the determined position of a work object and obtaining from the control deviation a control variable for the drive of the work it is possible to achieve considerably improved control properties.

In a preferred embodiment the inventional control method is governed by a process control computer.

The value of the current controller output is determined from the value of the current control deviation and of stored, recent values of the control variable and the control deviation. Only the two preceding values of the control deviation and of the control variable are preferably needed for that purpose, so that the past values of the control variable and of the control deviation need to be stored for only a part of a period of the periodic reference variable or the periodic disturbance variable, which act upon the movement of the work.

The present invention also comprises a control setup for controlling the drive for a work object to be moved along a specific defined path, which setup comprises a device for subdividing the path of the workpiece into equidistant sections, for example an incremental angle transmitter, with the controller of the control setup or part thereof generating the control variable from the control deviation presented to it which depends on the momentary position of the work along the defined path of travel. The controller comprises, besides the part controlling in the local domain, a controller part that is arranged parallel and controls contingent on time.

DETAILED DESCRIPTION OF THE PREFERRED EMBODIMENT

The invention is described hereafter with reference to the drawings with the aid of exemplary embodiments.

Figure 1:
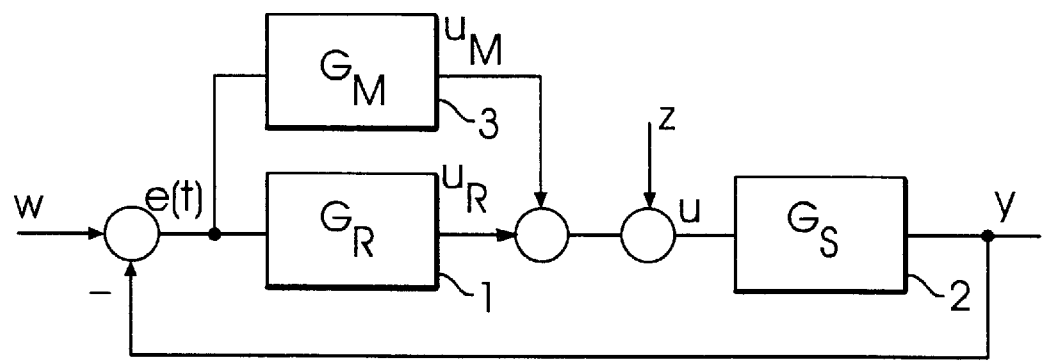
FIG. 1 illustrates a block diagram of a prior-art control arrangement.

The control arrangement shown in FIG. 1 is structurally a known feedback loop with a controller consisting of two components wired parallel and with a controlled system 2. Derived from the controlling variable w and the output y of the controlled system, by differentiation, is the control deviation e, which is applied across the input of the two controller parts 1 and 3 wired parallel. The outputs $u_R$ and $u_M$ of the two controller parts are added, and the result is the correction variable for the controlled system. The disturbances acting on the controlled system are signified by z in FIG. 1 and they act on the controlled system 2 as additional input and affect the actual correction variable u. As described already in the Background of the Invention, such a control arrangement is previously known from the German utility model G 92 00 708.2.

Periodic reference and disturbance variables occur which are not dependent on time. Rather, an original dependence is given as a function of the location on a specific predetermined or defined path, for example, a dependence upon a position or an angle. This dependence occurs, for example, due to pole reversal of an electric drive, which leads to an irregularity of the movement. In this case, disturbances are created depending on event. Disturbances contingent on a specific local position occur as well in a gear grinder where an indexing error occurs after a complete revolution, and in the case of a gear shaver where the grinding wheel touches the work always in the same position of the slide.

The invention allows for this circumstance by determining the control deviation caused by locally dependent disturbances contingent on the position of a workpiece as it travels along a defined path, that is, the control difference is not related to time, but to the position of the work. To that end, the position of the work along the specific defined path is inventionally monitored during the control procedure. Thus, instead of a strictly time-dependent control deviation, a position-dependent control deviation is used in performing the control, that is, a control deviation in the local range. A control variable for the drive of the work is subsequently obtained from the control deviation.

Figure 2:
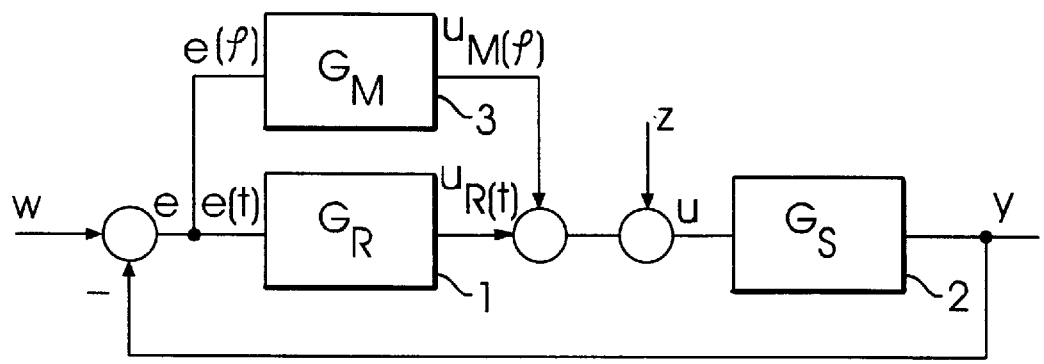
FIG. 2 shows a block diagram of a control setup according to the present invention.

The consequence for the prior-art control arrangement shown in FIG. 1 is, as illustrated in FIG. 2, that it must be modified. According to the present invention, the controller comprises additionally two controller parts 1, 3 whereof the first controller part 1 now controls in the time domain and the second controller part 3 in the local domain. That is, the feedback to the first controller part is the time-dependent control difference e(t) and to the second controller it is the position-dependent control deviation, presently the angle-dependent control deviation e(φ) as input variable. Hence, a transition from the control in the time domain to control in the local domain is effected in the second controller part 3. The first controller part 1, with the time-dependent control difference e(t) as input variable, now serves merely stationary control procedures for the case that the position of the work on the defined path has not changed yet or will change no longer. This may be the case, for example, in the cut-in, or startup, of the drive of the work to be machined. If only the controller part 3 controlling in the local domain were present, no control procedures whatsoever would take place during an operational phase with an exclusive control in the local domain, since there would be no travel along the defined path during this phase of operation. To avoid this, the controller part 1 (controlling exclusively in the time domain and featuring as input variable the time-dependent control deviation e(t)) is wired parallel to the controller part 3.

Figure 3:
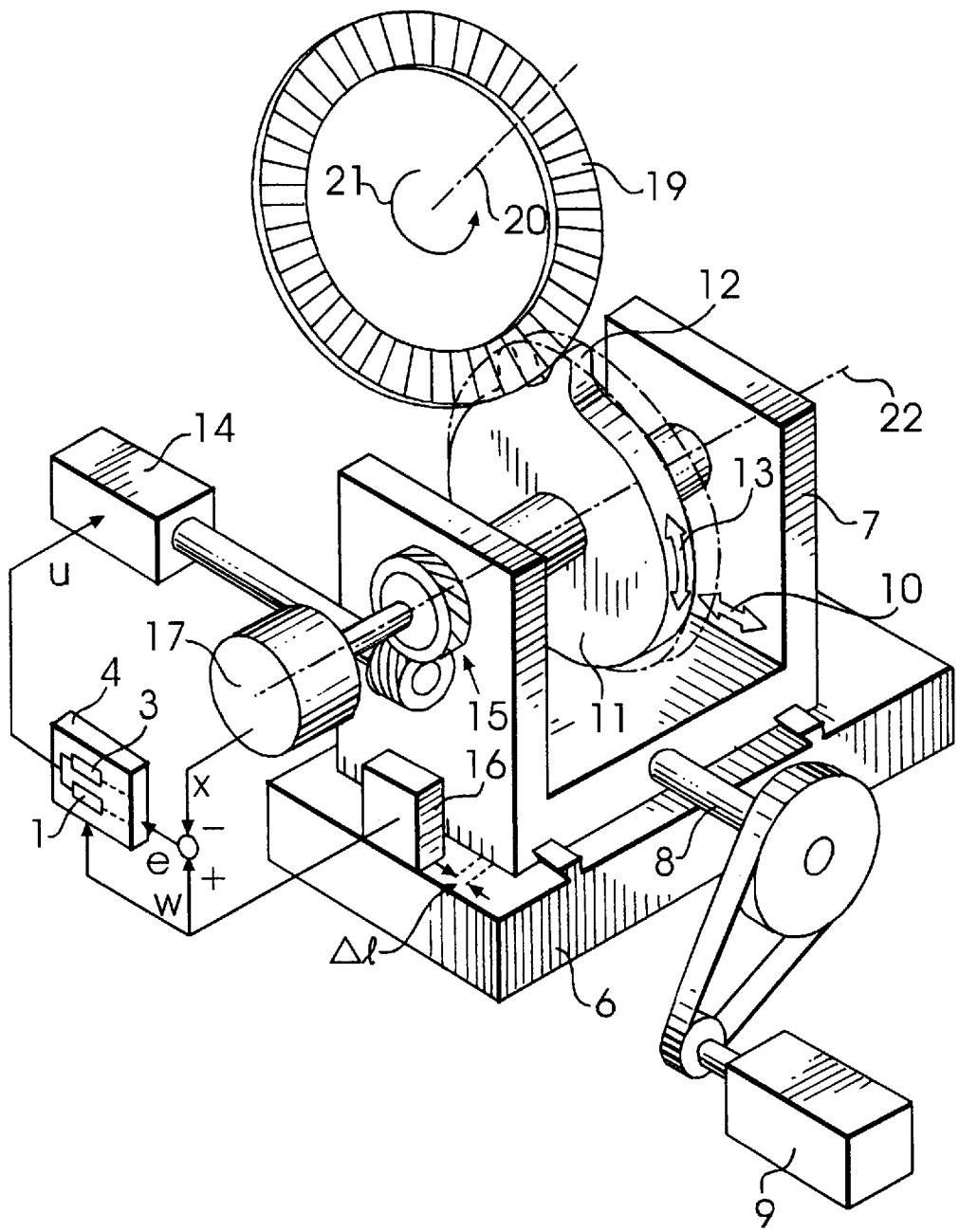
FIG. 3 schematically illustrates a shaving grinder for explanation of the present invention.

The invention and its effects are illustrated hereafter with the aid of the gear shaver shown in FIG. 3.

A slide 7 is arranged on sliding base 6 in a fashion allowing linear movement. The linear displacement of slide 7 is effected by drive 9 via lead screw 8, in a way such that the slide reciprocates as indicated by double arrow 10. Mounted on slide 7, rotatable about axis 22, is the shaving cutter 11 to be ground. For simplicity, only two teeth 12 are shown of shaving cutter 11. The shaving cutter can be rotationally reciprocated by means of drive 14 via worm gear mechanism 15, as indicated by double arrow 13. Grinding wheel 19 engages the space between two teeth 12 of shaving cutter 11, the grinding wheel rotating about skewed axis 20 as indicated by arrow 21. Each reciprocating motion of shaving cutter 11 coincides with an abrasive contact with the grinding wheel 19. This contact has a disturbing effect on the torque of drive 14, by which shaving cutter 11 must be rotated back and forth as a consequence of the linear motion of slide 7. This disturbance may result in defects in grinding the shaving cutter 11. As described above, such disturbance occurs at each reciprocating motion of shaving cutter 11 as it enters in abrasive contact with grinding wheel 19. Since the reciprocating motion of slide 7 and the reciprocating motion of shaving cutter 11 occur periodically, the disturbance contact between shaving cutter 11 and grinding wheel 19 also occurs at the same basic frequency as the movement of slide 7. Hence, periodic and locally dependent disturbances are concerned in this case, since the disturbances occur only in a specific slide position.

According to the present invention, the dependence of the torque error of drive 14 upon the slide position 1 is now determined. Depending on the change Δl of the slide position, the respective control deviation e is determined, and controller 4 generates a control variable u. Required, therefore, is feeding to controller 4 the slide position provided by sensor 16. In the exemplary embodiment illustrated in FIG. 3, controller 4 comprises not only the part 3 that controls in position dependence but, wired in parallel, also a part 1 controlling in time-dependent manner. As described with the aid of FIG. 2, the position-dependent control deviation is fed to controller part 3, the time-dependent control deviation to part 1. Thus, controller 4 produces from the slide position and the control deviation depending on it the control variable u for drive 14 of shaving cutter 11. Since the abrasive contact between grinding wheel 19 and shaving cutter 11 diminishes as the grinding operation continues, the disturbing effect of the abrasive contact on the torque of drive 14 diminishes with the ongoing grinding operation. Therefore, continual feedback of the control deviation e to controller 4 is necessary for detection of the momentary dependence of the control deviation e on the position of slide 7.

Figure 4:
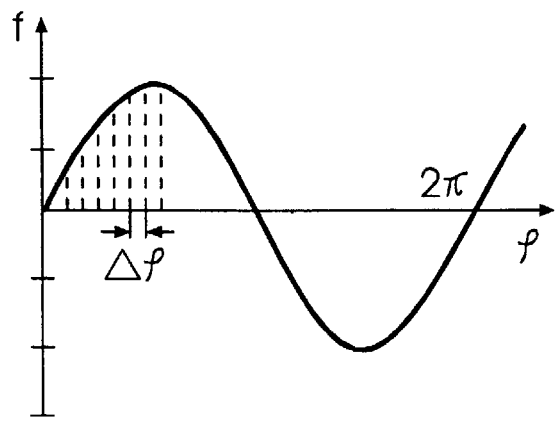
FIG. 4 shows a diagram illustrating the angle error occurring with a gear grinder within a period of the work object.

As another example for illustration of the invention, a gear grinder is considered where within one revolution of the gear the indexing error f occurs, which is illustrated in FIG. 4 and depends on the angular position φ of the gear. Indexing error f passes within one revolution of the work exactly through one period. Based on the dependence of indexing error f upon angular position φ, an appropriate control variable is generated for tune-out of the indexing error. Although the basic pattern of dependence of angular error f upon angular position φ of the gear remains unchanged, the dependence will nonetheless change quantitatively with increasing machining, to the effect that the indexing error diminishes gradually contingent upon the angular position of the gear. It is conceivable to determine, after each constant angle of rotation Δφ of the gear, its angular position φ along with the value of indexing error f depending on the momentary angular position. This method suggests itself notably for computerized control methods employing discrete scanning values. Inventionally, the control is carried out not in the time domain, but in the local domain, so that the scanning values according to the invention are not obtained in equidistant time intervals, but in equidistant angular intervals Δφ. The angle of rotation 2π as illustrated in FIG. 4, f=f(φ), corresponds in time representation to f=f(t) of one period T.

Figure 5:
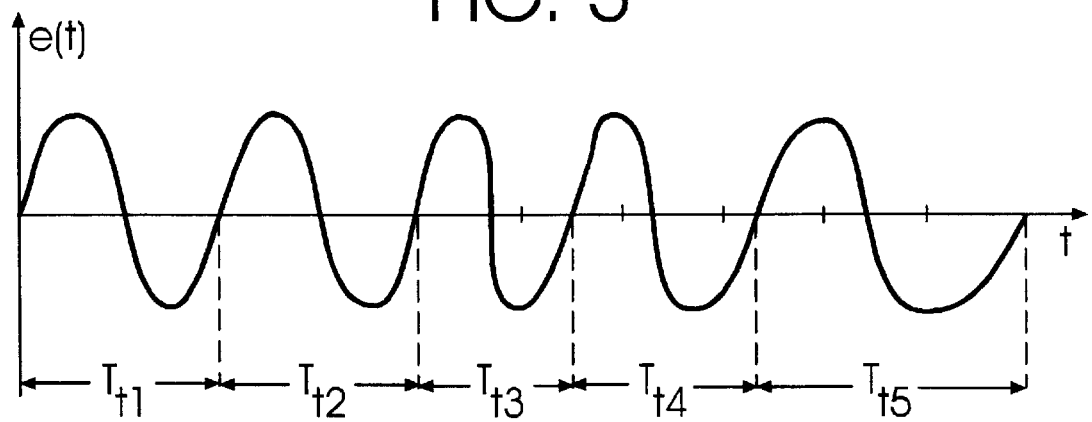
FIG. 5 shows an illustration of a sine-shaped error of the angle of rotation, with a fluctuating period in the time range.
Figure 6:
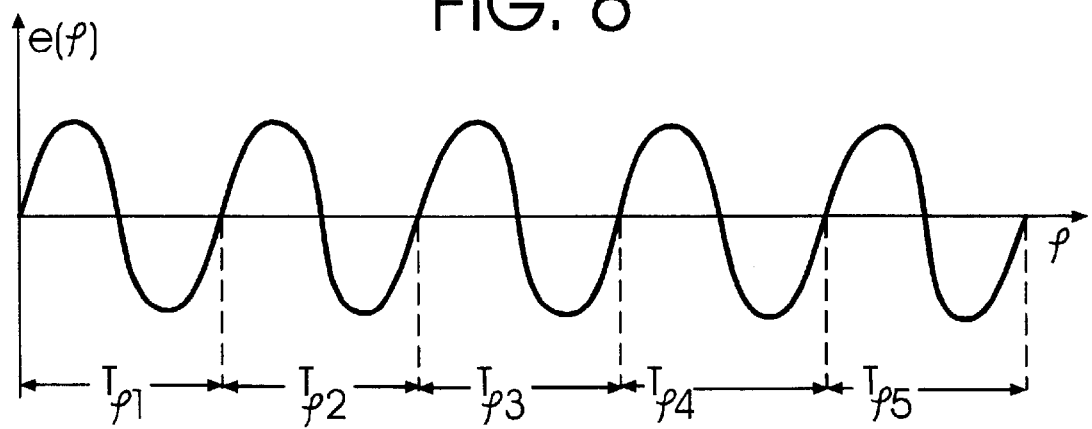
FIG. 6 shows an illustration of the same sine-shaped error of the angle of rotation as in FIG. 5 in the local range with a constant period.

The effect of the inventional measure is illustrated hereafter with reference to FIGS. 5 and 6. FIG. 5 shows the pattern of a periodic and time-dependent rotational angle error e(t) with a variable period in the time domain. From FIG. 5 it follows that due to the changing period of the time-dependent rotational angle error e(t) changes occur also in the individual period of the oscillations, with the result that fluctuating periods $T_{t1}$ through $T_{t5}$ occur. The same periodically occurring, sine-shaped rotational angle error is illustrated in FIG. 6 in the local domain, that is, with reference to FIG. 4 depending on the angular position φ of the gear. Due to the fact that the angular error e(φ) 2π occurs periodically, a period deviation in the local domain, that is, as regards the angular position, does not occur even with a frequency change of the rotational angle error in the time domain, for instance, by acceleration of the gear drive. Therefore, the periods $T_{\phi 1}$ through $T_{\phi 5}$ of the locally dependent rotational angle error e(φ) appear constant in the local domain.

Figure 7:
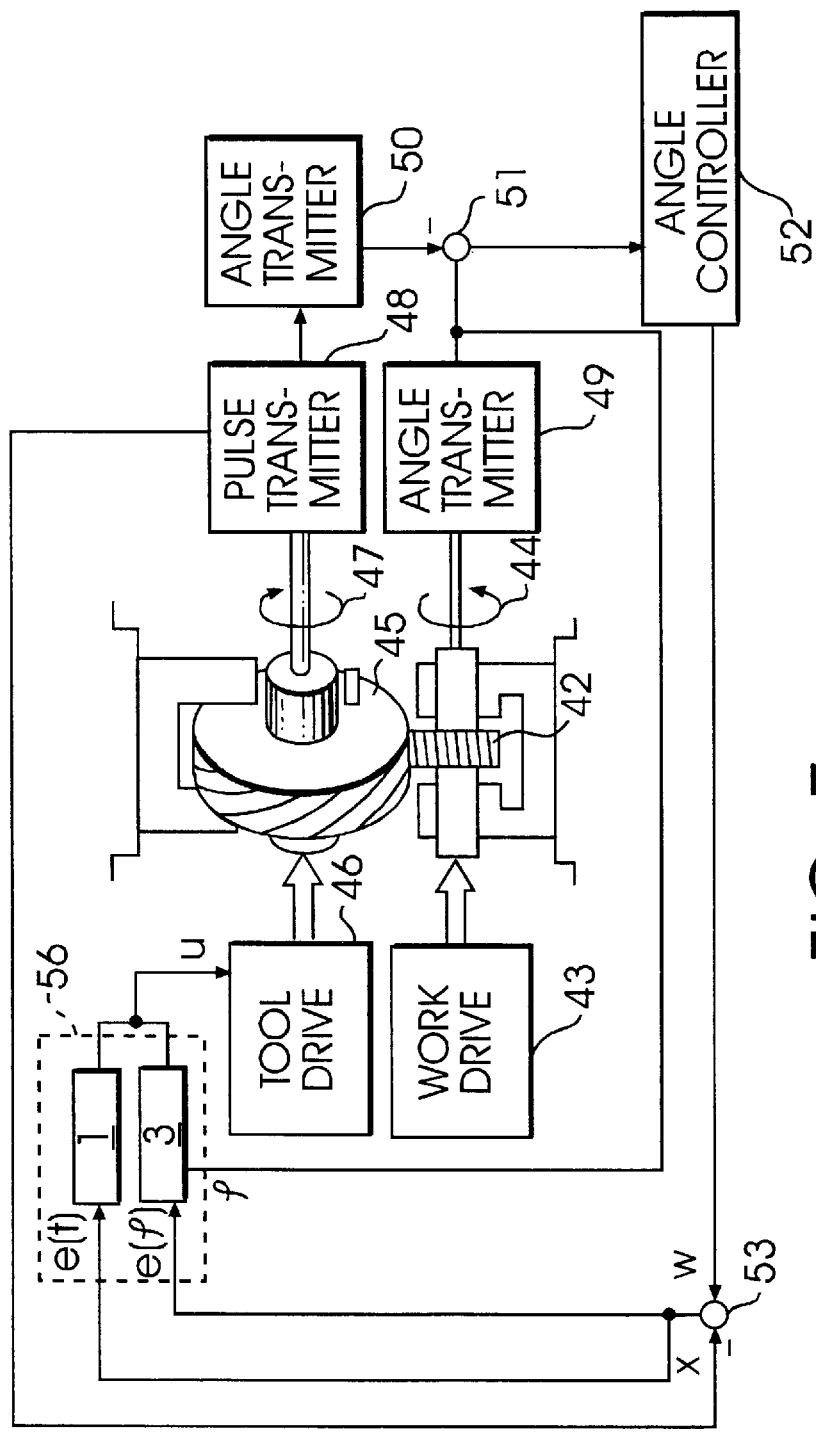
FIG. 7 illustrates a gear cutting machine operating in a continuous rolling method with the control method of the present invention applied.

FIG. 7 shows a further example for illustration of the present invention. A gear type, or worm type, tool 45 rolls continuously with a gear-shaped workpiece 42. Workpiece 42 is speed-controlled by drive 43, producing the direction of rotation indicated by arrow 44. Tool 45 is driven by sequential drive 46, producing the direction of rotation indicated by arrow 47. Coupled with work 42 is an angle transmitter 49 and coupled with tool 45 is a pulse transmitter 48 and angle transmitter 50. The output signals generated by the two angle transmitters 49, 50 are transmitted to the difference former 51. The control deviation generated thereby is passed to angle controller 52 producing the set speed for sequential drive 46. The set speed w and the speed controller output x generated by pulse transmitter 48 are passed to another difference former 53, which generates the control deviation e. Tool 45 has in comparison to work 42 small teeth deviations, thereby causing speed and angle fluctuations between tool 45 and work 42. Tool drive 46 is governed by controller 56 with feedback of correction variable u to tool drive 46. According to the invention, controller 56 comprises in addition to the known time-dependent controller part 1 a controller part 3 with a position-dependent mode, which receives as input variable the position-dependent control deviation e(φ). Both controller parts 1, 3 are wired parallel. The angular position of the work is detected by angle transmitter 49, preferably after equidistant variations Δφ, and the control deviation corresponding to the current angular position is determined by difference former 53.

Figure 8:
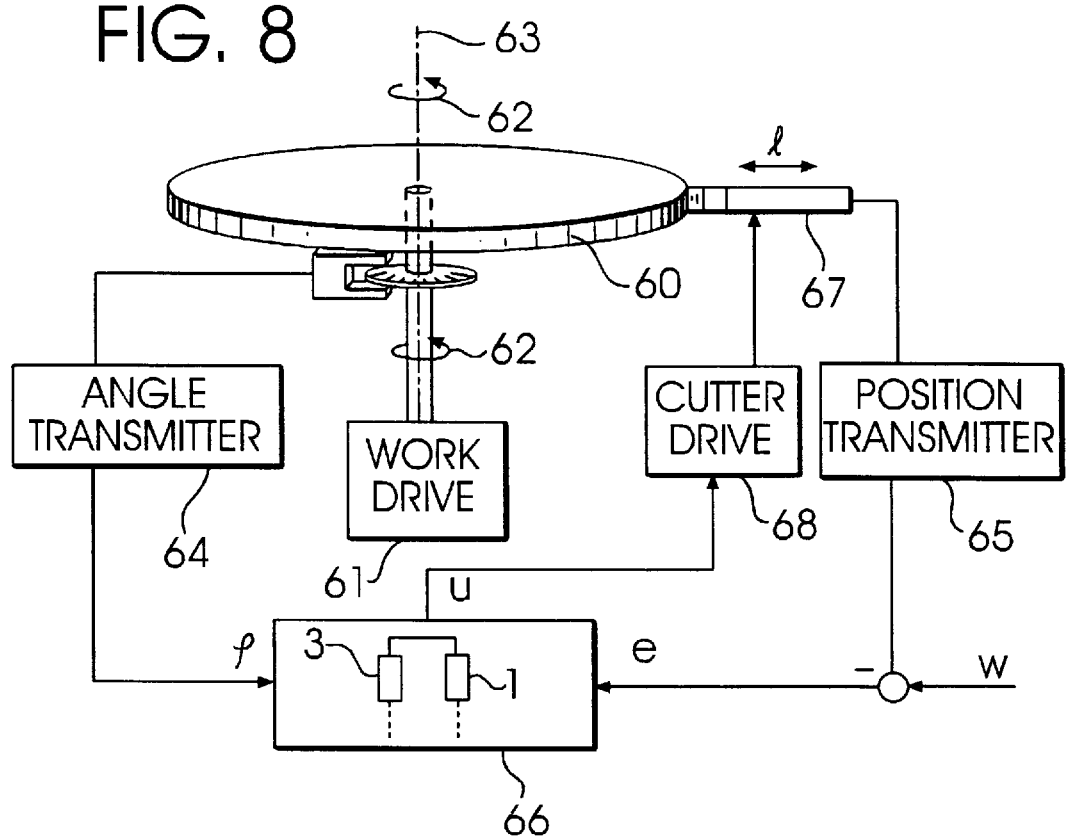
FIG. 8 illustrates a circuit arrangement where the control deviation is obtained from a variable other than the defined path of the work.

In the embodiments shown in FIGS. 3 and 7, the control deviation e passed to controllers 4 and 56, respectively, derives directly from the respective defined path, that is, respectively, from the position of slide 7 and the angular position of work 42. To show that the control deviation e can be derived also from a variable other than the defined path of the respective work, FIG. 8 shows a further, simplified exemplary embodiment. An elliptic disk 60 is machined with the aid of cutter 67. Work drive 61 rotates the work 60 about axis 63 in the direction of arrow 62. The task is rounding the work 60 with the aid of cutter 67. The thickness of the stock removed by the cutter increases whenever, as shown in FIG. 8, the part of disk 60 with the semi-major axis passes by cutter 67. Each contact between disk 60 and cutter 67 affects the drive of disk 60, producing a rotational angle error depending on the respective angular position of disk 60. The angular position of disk 60 is determined by angle transmitter 64 with feedback to controller 66. Mounted in flexible manner, cutter 67 swings periodically about a set position due to the elliptic shape of disk 60. The feed of cutter 67 dictates to what extent disk 60 is still elliptic in shape or whether it has assumed circular shape. Therefore, the position l of cutter 67 is determined by position transmitter 65, and the control deviation e is obtained by the difference between a reference variable w and the feed path l of cutter 67, which difference is passed to controller 66. In the exemplary embodiment illustrated in FIG. 8, control is thus performed in the local domain, since a control correction variable u for the cutter drive 68 is determined depending on the angular position φ of disk 60 and the control deviation e which is obtained not from the angular position p of disk 60, but from another variable, namely position l of cutter 67. φ The control method according to the invention is preferably applied with the aid of a digital computer, using an algorithm that will be developed hereafter.

The calculation of the coefficient of a control algorithm operating in the local domain will be shown hereafter.

Figure 9:
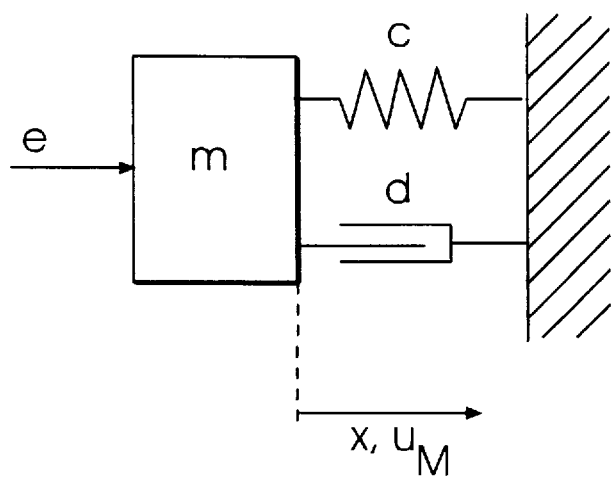
FIG. 9 shows a schematic illustration of the oscillation model for mathematical description of a disturbance variable controller.

The known oscillation model may, with reference to FIG. 9, be described generally by a sine-stimulated mass m with a spring constant c and damping constant d. The input variable of the oscillation model is the control deviation e, which may be perceived as the force stimulating the mass m. The output of the oscillation model corresponds to the velocity of the oscillating mass. Therefore, the following known differential equation can be established for the velocity $u_M$:

$$m \cdot \ddot{u}_M + d \cdot \dot{u}_M + c \cdot u_M = \dot{e} \quad (1)$$

Transferring the differential equation in the time domain by means of Laplace transformation to the frequency domain, the following formula results as the transfer function of the disturbance controller:

$$G_M(s) = \frac{U_M(s)}{E(s)} = \frac{g_1 \cdot s}{s^2 \cdot h_2 + s \cdot h_1 + 1} \quad (2)$$

Here, $h_1$ is analogous to the damping of the mass oscillator, $h_2$ allows for the squared reciprocal of the oscillation number from 0 to $2\pi$, and $g_1$ determines the amplitude amplification of the input signal. When now, depending on the position of the work, disturbances occur on a defined path, the correction variable and the control deviation of the control setup (as described with the aid of FIG. 6 already) will no longer have an original dependence on frequency. This means that the complex variable s in the pertaining transfer function of the oscillation model has no longer the dimension $rad^{-1}$, but is dimensionless.

Equation (2) describes the relationship between control deviation and output of the disturbance controller as a system of second order. However, disturbance controllers of systems of higher order can be realized as well.

According to the book "Grundlagen der Regelungstechnik" *Fundamentals of Control Engineering* by Dörrscheidt and Latzel, Teubner-Verlag, Stuttgart, 1989, p. 428–429, control algorithms in polynomial form could be proposed for disturbance controllers of second order, which algorithms are used in converting control methods to digital computer. Generally applicable for the transfer function of a second-order controller with input $e_k$ and output $u_{mk}$ is thus:

$$G_M(s) = \frac{g_0 + g_1 s + g_2 s^2}{h_0 + h_1 s + h_2 s^2} \quad (3)$$

For the transfer function described under (3), the following control algorithm is available according to Dörrscheidt/Latzel:

$$u_{m_k} = d_0 \cdot e_k + d_1 \cdot e_{k-1} + d_2 \cdot e_{k-2} + c_1 \cdot u_{M_{k-1}} + c_2 \cdot u_{M_{k-2}} \quad (4)$$

According to Dörrscheidt/Latzel, the coefficients of the control algorithm ($d_0$, $d_1$, $d_2$, $c_1$, $c_2$) can be determined depending on the coefficients of the pertaining transfer function ($g_0$, $g_1$, $g_2$, $h_0$, $h_1$, $h_2$). The assumption with algorithm (4) is that the discrete values of the control deviation $e_{k-i}$ and of the control correction variable $um_{k-i}$ are obtained by scanning at an interval T. Indices k, k−1, k−2 represent the current value and the input or output value of the disturbance controller preceding the current value by T or 2T.

The formulas derived from the said book for calculating the coefficient of the aforementioned algorithm for control in the time domain can be transferred easily to the local domain, by replacing the scanning interval T by the scanning interval in the local domain. As described with the aid of FIG. 4, the position of the work on the defined path, the value of the control deviation and the dependence of the control deviation upon the position of the work on the defined path are determined after each equidistant change $\Delta l$ of the work position on the defined path. The coefficients of the control algorithm according to formula (4) are thus subject to the following:

$$d_0 = \frac{g_0 + g_1 \frac{2}{\Delta l} + g_2 \left(\frac{2}{\Delta l}\right)^2}{h_0 + h_1 \frac{2}{\Delta l} + h_2 \left(\frac{2}{\Delta l}\right)^2} \quad (5)$$

$$d_1 = \frac{2g_0 - 2g_2 \left(\frac{2}{\Delta l}\right)^2}{h_0 + h_1 \frac{2}{\Delta l} + h_2 \left(\frac{2}{\Delta l}\right)^2} \quad (6)$$

$$d_2 = \frac{g_0 - g_1 \frac{2}{\Delta l} + g_2 \left(\frac{2}{\Delta l}\right)^2}{h_0 + h_1 \frac{2}{\Delta l} + h_2 \left(\frac{2}{\Delta l}\right)^2} \quad (7)$$

$$c_1 = -\frac{2h_0 - 2h_2 \left(\frac{2}{\Delta l}\right)^2}{h_0 + h_1 \frac{2}{\Delta l} + h_2 \left(\frac{2}{\Delta l}\right)^2} \quad (8)$$

$$c_2 = \frac{h_0 - h_1 \frac{2}{\Delta l} + h_2 \left(\frac{2}{\Delta l}\right)^2}{h_0 + h_1 \frac{2}{\Delta l} + h_2 \left(\frac{2}{\Delta l}\right)^2} \quad (9)$$

In case the defined path is the angle of rotation $\phi$, a scanning interval of $\Delta\phi$ applies. Basing on the transfer function according to formula (2) (i.e., $g_0=g_1=0$ and $h_0=1$ in the transfer function according to formula (4)), as derived from the oscillation model, the following applies to the locally (angularly) dependent coefficients of the control algorithm:

$$d_1 = 0 \quad (10)$$

$$d_0 = -d_2 = \frac{g_1 \cdot \frac{2}{\Delta\phi}}{1 + h_1 \cdot \frac{2}{\Delta\phi} + h_2 \cdot \left(\frac{2}{\Delta\phi}\right)^2} \quad (11)$$

$$c_1 = -\frac{2 - 2 \cdot h_2 \cdot \left(\frac{2}{\Delta\phi}\right)^2}{1 + h_1 \cdot \frac{2}{\Delta\phi} + h_2 \cdot \left(\frac{2}{\Delta\phi}\right)^2} \quad (12)$$

$$c_2 = \frac{1 - h_1 \cdot \frac{2}{\Delta\phi} + h_2 \cdot \left(\frac{2}{\Delta\phi}\right)^2}{1 + h_1 \cdot \frac{2}{\Delta\phi} + h_2 \cdot \left(\frac{2}{\Delta\phi}\right)^2} \quad (13)$$

$u_{mk}$ describes now the control correction variable issued by the disturbance variable controller for a current angle, that is, the output of the disturbance variable controller, while $e_k$ describes the current input signal, or current control deviation, of the disturbance variable controller which, modeled on FIG. 4, is caused by the rotational angle error f. Indices k, k−1, k−2 are now representative of, respectively, the current angular position φ and the input or output values of the disturbance variable controller which precede the current angular position φ by Δφ or 2Δφ. Noteworthy for the control algorithm according to formula (4) is that the value of the current control correction variable $u_{mk}$ can be calculated from merely the two preceding values of the control correction variable $u_m$ and the control deviation e as well as the momentary value of the control deviation. For the inventional control method and the inventional control setup this means that with a second-order system only the last two values of the control deviation $e_{k-1}$, $e_{k-2}$ preceding the current angular position and of the control correction variable $u_{mk-1}$, $u_{mk-2}$ need to be stored. This has the appreciable advantage that the values of control deviation e required for calculating the current value of control correction variable $u_{mk}$ and the preceding values of the control correction variable $u_M$ need to be stored not over at least one period, but (as evident with the aid of FIG. 4) only for a fraction of a period. Hence, the disturbance variable controller is able to respond very quickly to a change of phase and amplitude of a sine-shaped disturbance variable.

Since the aforementioned control algorithm does not require the calculation of the system, or system model representing a mathematical description of the controlled system, the computing effort remains within limits. Therefore, the problems mentioned with respect to the Luenberger observer cannot arise. The inventional control method and arrangement thus allows a control that is dependent on part of a period, since the values necessary for calculation are being stored only for a fraction of the period, namely only the values preceded by Δφ and 2Δφ.

As mentioned already, the remaining part of the controlled system must nonetheless be described and controlled depending on time, despite the control in the local range which is dependent on the position of the work on a defined path. As illustrated already with the aid of the preceding exemplary embodiments, it is therefore necessary to determine after each completion of an angle Δφ the rotational angle deviation f(φ), respectively the control deviation e(φ). This can be accomplished with the aid of a timer interrupt and with a further interrupt to be set up in the process control computer used in the control setup.

We claim:

1. A method for controlling the drive of a first work object of a machine tool, where the first work object interacts with a second work object which travels along a controlled path with a motion that is affected by said interaction with said first work object, comprising the steps of:

generating a system deviation signal as a function of the difference between a reference signal and a signal representing the motion of said first work object;

supplying said system deviation signal to a controller that produces a drive signal for controlling said drive such that said first work object is moved in a manner that minimizes said system deviation signal;

sensing the motion of said second work object and producing sampling pulses at predetermined points along said controlled path of said second work object;

utilizing said sampling pulses in said controller to sample the value of said system deviation signal at each of said predetermined points;

successively calculating position-related values of said drive signal using in each calculation the most recently sampled value of said system deviation signal; and applying said position-related drive signals to said drive to control the movement of said first work object.

2. The method of claim 1 comprising the further steps of:

successively calculating time-related values of said drive signal using in each calculation the present value of said system deviation signal supplied to said controller; and applying said time-related drive signals to said drive in the absence of said sampling pulses to control the movement of said first work object.

3. The method of claim 1 wherein said predetermined points along said controlled path of said second work object are equidistant from one another.

4. The method of claim 1 wherein said successive position-related drive signals are calculated according to a control algorithm of a specific order under control of a process computer.

5. The method of claim 1, comprising the further steps of:

storing said sampled values of said system deviation signal;

calculating a new value of said position-related drive signal each time a new sampled value of said system deviation signal is obtained; and storing successive calculated position-related drive signals, said control algorithm utilizing each new sampled value of said system deviation signal as well as said stored system deviation signals and stored position-related drive signals to determine said new value of said position-related drive signal.

6. The method of claim 5 wherein said control algorithm is of the second order based on the transfer function $$G_M(s) = \frac{g_0 + g_1 s + g_2 s^2}{h_0 + h_1 s + h_2 s^2}$$

according to the following formula:

$$u_{mk}(l_k) = d_0(\Delta l) \cdot e_k(l_k) + d_1(\Delta l) \cdot e_{k-1}(l_{k-1}) + d_2(\Delta l) \cdot e_{k-2}(l_{k-2}) +$$
$$c_1(\Delta l) \cdot u_{mk-1}(l_{k-1}) + c_2(\Delta l) \cdot u_{mk-2}(l_{k-2})$$

where $l_k = l_{k-1} + \Delta l$, and, $$d_0 = \frac{g_0 + g_1 \frac{2}{\Delta l} + g_2 \left(\frac{2}{\Delta l}\right)^2}{h_0 + h_1 \frac{2}{\Delta l} + h_2 \left(\frac{2}{\Delta l}\right)^2}$$

$$d_1 = \frac{2g_0 - 2g_2 \left(\frac{2}{\Delta l}\right)^2}{h_0 + h_1 \frac{2}{\Delta l} + h_2 \left(\frac{2}{\Delta l}\right)^2}$$

$$c_1 = -\frac{2h_0 - 2h_2 \left(\frac{2}{\Delta l}\right)^2}{h_0 + h_1 \frac{2}{\Delta l} + h_2 \left(\frac{2}{\Delta l}\right)^2}$$

$$d_2 = \frac{g_0 - g_1 \frac{2}{\Delta l} + g_2 \left(\frac{2}{\Delta l}\right)^2}{h_0 + h_1 \frac{2}{\Delta l} + h_2 \left(\frac{2}{\Delta l}\right)^2}$$

-continued $$c_2 = -\frac{h_0 - h_1\frac{2}{\Delta l} + h_2\left(\frac{2}{\Delta l}\right)^2}{h_0 + h_1\frac{2}{\Delta l} + h_2\left(\frac{2}{\Delta l}\right)^2}$$

where:
$\Delta l$=equidistant change in workpiece position;
$l_k$=workpiece position;
$l_{k-1}$=preceding workpiece position;
$e_k$=control deviation;
$e_{k-1}$=first preceding control deviation;
$e_{k-2}$=second preceding control deviation;
$u_{mk}$=control variable;
$u_{mk-1}$=first preceding control variable;
$u_{mk-2}$=second preceding control variable;
$g_0$, $g_1$, $g_2$, $h_0$, $h_1$, $h_2$=coefficients of the transfer function;
s=complex variable of transfer function.

7. A machine tool in which first and second work objects are moved in a controlled manner and interact with one another to modify one of said objects, and in which said second work object travels along a controlled path with a motion that is affected by said interaction with said first work object, said machine tool comprising:
a drive for moving said first work object;
means for generating a reference signal;
means for generating a motion signal representing the motion of said first work object;
a feedback circuit for generating a system deviation signal as a function of the difference between said reference signal and said motion signal;
a controller receiving said system deviation signal and producing in response thereto a drive signal for controlling said drive in a manner that minimizes said system deviation signal;
a sensor for sensing the motion of said second work object and providing sampling pulses at predetermined points along said controlled path of said second work object, said controller operating in response to each of said sampling pulses to sample the value of said system deviation signal at each of said predetermined points; and
a calculator included in said controller for successively calculating position-related values of said drive signal using in each calculation the most recently sampled value of said system deviation signal, said position-related drive signals being applied to said drive to control the movement of said first work object.

8. The machine tool of claim 7, further comprising:
means included in said calculator for successively calculating time-related values of said drive signal using in each calculation the present value of said system deviation signal received by said controller, said time-related drive signals being applied to said drive to control the movement of said first work object in the absence of said sampling pulses.

9. The machine tool of claim 7 wherein said predetermined points along said controlled path of said second work object are equidistant from one another.

10. The machine tool of claim 7 wherein said successive position-related drive signals are calculated according to a control algorithm of a specific order under control of a process computer.

11. The machine tool of claim 6 wherein said calculator calculates a new value of said position-related drive signal each time a new sampled value of said system deviation signal is obtained, and wherein said controller includes:
first storage means for storing said sampled values of said system deviation signal; and
second storage means for storing said successive calculated values of said position-related drive signals, said calculator utilizing each new sampled value of said system deviation signal as well as said stored system deviation signals and stored position-related drive signals to determine the new value of said position-related drive signal.

12. The machine tool of claim 11, wherein said control algorithm is of the second order based on the transfer function $$G_M(s) = \frac{g_0 + g_1 s + g_2 s^2}{h_0 + h_1 s + h_2 s^2} \tag{3}$$

according to the following formula:

$$u_{mk}(l_k) = d_0(\Delta l) \cdot e_k(l_k) + d_1(\Delta l) \cdot e_{k-1}(l_{k-1}) + d_2(\Delta l) \cdot e_{k-2}(l_{k-2}) +$$
$$c_1(\Delta l) \cdot u_{mk-1}(l_{k-1}) + c_2(\Delta l) \cdot u_{mk-2}(l_{k-2})$$

where $l_k = l_{k-1} + \Delta l$, and, $$d_0 = \frac{g_0 + g_1\frac{2}{\Delta l} + g_2\left(\frac{2}{\Delta l}\right)^2}{h_0 + h_1\frac{2}{\Delta l} + h_2\left(\frac{2}{\Delta l}\right)^2}$$

$$d_1 = \frac{2g_0 - 2g_2\left(\frac{2}{\Delta l}\right)^2}{h_0 + h_1\frac{2}{\Delta l} + h_2\left(\frac{2}{\Delta l}\right)^2}$$

$$c_1 = -\frac{2h_0 - 2h_2\left(\frac{2}{\Delta l}\right)^2}{h_0 + h_1\frac{2}{\Delta l} + h_2\left(\frac{2}{\Delta l}\right)^2}$$

$$d_2 = \frac{g_0 - g_1\frac{2}{\Delta l} + g_2\left(\frac{2}{\Delta l}\right)^2}{h_0 + h_1\frac{2}{\Delta l} + h_2\left(\frac{2}{\Delta l}\right)^2}$$

$$c_2 = -\frac{h_0 - h_1\frac{2}{\Delta l} + h_2\left(\frac{2}{\Delta l}\right)^2}{h_0 + h_1\frac{2}{\Delta l} + h_2\left(\frac{2}{\Delta l}\right)^2}$$

where:
$\Delta l$=equidistant change in workpiece position;
$l_k$=workpiece position;
$l_{k-1}$=preceding workpiece position;
$e_k$=control deviation;
$e_{k-1}$=first preceding control deviation;
$e_{k-2}$=second preceding control deviation;
$u_{mk}$=control variable;
$u_{mk-1}$=first preceding control variable;
$u_{mk-2}$=second preceding control variable;
$g_0$, $g_1$, $g_2$, $h_0$, $h_1$, $h_2$=coefficients of the transfer function;
s=complex variable of transfer function.

* * * * *